US012705895B2

(12) United States Patent
Wu et al.

(10) Patent No.: US 12,705,895 B2
(45) Date of Patent: Aug. 11, 2026

(54) VIDEO COMPARISON METHOD AND APPARATUS, COMPUTER DEVICE, AND STORAGE MEDIUM

(71) Applicant: TENCENT TECHNOLOGY (SHENZHEN) COMPANY LIMITED, Shenzhen (CN)

(72) Inventors: Jiyang Wu, Shenzhen (CN); Churong Liu, Shenzhen (CN); Rui Guo, Shenzhen (CN); Jiarun Luo, Shenzhen (CN); Yiyang Xu, Shenzhen (CN); Zongxing Xie, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 401 days.

(21) Appl. No.: 17/722,300

(22) Filed: Apr. 15, 2022

(65) Prior Publication Data

US 2022/0237917 A1 Jul. 28, 2022

Related U.S. Application Data

(63) Continuation of application No. PCT/CN2020/122626, filed on Oct. 22, 2020.

(30) Foreign Application Priority Data

Mar. 17, 2020 (CN) ......................... 202010187813.1

(51) Int. Cl.
*G06V 20/40* (2022.01)
*G06V 10/48* (2022.01)
(Continued)

(52) U.S. Cl.
CPC .............. *G06V 20/46* (2022.01); *G06V 10/48* (2022.01); *G06V 10/751* (2022.01); *G06V 10/82* (2022.01); *H04N 19/40* (2014.11)

(58) Field of Classification Search
CPC ...... G06V 20/46; G06V 10/48; G06V 10/751; G06V 10/82; G06V 20/41; H04N 19/40;
(Continued)

(56) References Cited

U.S. PATENT DOCUMENTS

| | | | |
|---|---|---|---|
| 10,574,890 | B2 | 2/2020 | Moloney et al. |
| 2005/0036702 | A1 | 2/2005 | Yang et al. |

(Continued)

FOREIGN PATENT DOCUMENTS

| | | | |
|---|---|---|---|
| CN | 104166967 | A | 11/2014 |
| CN | 105469411 | A | 4/2016 |

(Continued)

OTHER PUBLICATIONS

Kafetzakis, Emmanouil, et al. "The impact of video transcoding parameters on event detection for surveillance systems." 2013 IEEE International Symposium on Multimedia. IEEE, 2013. (Year: 2013).*

(Continued)

*Primary Examiner* — Amandeep Saini
*Assistant Examiner* — Denise G Alfonso
(74) *Attorney, Agent, or Firm* — Anova Law Group, PLLC

(57) ABSTRACT

A video comparison method includes: obtaining a first video and a second video; obtaining a first image sequence from the first video, and obtaining a second image sequence from the second video; extracting a first definition feature vector of the first image sequence by using a first feature extraction mechanism of a video comparison model; extracting a second definition feature vector of the second image sequence by using a second feature extraction mechanism of the video comparison model, the first feature extraction mechanism being the same as the second feature extraction mechanism; and determining a definition difference between the first video and the second video based on the first (Continued)

definition feature vector and the second definition feature vector by using a definition difference analysis mechanism of the video comparison model.

20 Claims, 5 Drawing Sheets

(51) Int. Cl.
*G06V 10/75* (2022.01)
*G06V 10/82* (2022.01)
*H04N 19/40* (2014.01)

(58) Field of Classification Search
CPC .......... G06N 3/045; G06T 2207/10016; G06F 18/22
See application file for complete search history.

(56) References Cited

U.S. PATENT DOCUMENTS

| | | | |
|---|---|---|---|
| 2007/0216787 A1 | 9/2007 | Lin et al. | |
| 2012/0008051 A1 | 1/2012 | Gaddy et al. | |
| 2020/0021865 A1* | 1/2020 | Topiwala | H04N 21/23418 |

FOREIGN PATENT DOCUMENTS

| | | | | |
|---|---|---|---|---|
| CN | 107103331 A | | 8/2017 | |
| CN | 108540807 A | | 9/2018 | |
| CN | 108682024 A | | 10/2018 | |
| CN | 110689524 A | | 1/2020 | |
| CN | 110826475 A | * | 2/2020 | G06K 9/00711 |
| CN | 111414842 A | | 7/2020 | |
| WO | WO-2020019295 A1 | * | 1/2020 | H04N 17/002 |

OTHER PUBLICATIONS

Wang, Xuanhan, et al. "Beyond frame-level CNN: saliency-aware 3-D CNN with LSTM for video action recognition." IEEE signal processing letters 24.4 (2016): 510-514. (Year: 2017).*
Liu, Hao, et al. "Mobile endoscopy vs video tower: a prospective comparison of video quality and diagnostic accuracy." Otolaryngology—Head and Neck Surgery 155.4 (2016): 575-580. (Year: 2016).*
Xu, Munan, et al. "C3DVQA: Full-reference video quality assessment with 3D convolutional neural network." ICASSP 2020-2020 IEEE international conference on acoustics, speech and signal processing (ICASSP). IEEE, 2020. (Year: 2020).*
Le Callet, Patrick, Christian Viard-Gaudin, and Dominique Barba. "A convolutional neural network approach for objective video quality assessment." IEEE transactions on neural networks 17.5 (2006): 1316-1327. (Year: 2006).*
Bosse, Sebastian, et al. "Deep neural networks for no-reference and full-reference image quality assessment." IEEE Transactions on image processing 27.1 (2017): 206-219. (Year: 2017).*
Manasa, K., and Sumohana S. Channappayya. "An optical flow-based full reference video quality assessment algorithm." IEEE Transactions on Image Processing 25.6 (2016): 2480-2492. (Year: 2016).*
Ullah, Amin, et al. "Action recognition in video sequences using deep bi-directional LSTM with CNN features." IEEE access 6 (2017): 1155-1166. (Year: 2017).*
The State Intellectual Property Office of the People's Republic of China (SIPO) Office Action 1 for 202010187813.1 Dec. 22, 2020 6 Pages (including translation).
The World Intellectual Property Organization (WIPO) International Search Report for PCT/CN2020/122626 Jan. 20, 2021 7 Pages (including translation).
Le Kang et al., "Convolutional Neural Networks for No-Reference Image Quality Assessment," In Proceedings of the IEEE conference on computer vision and pattern recognition, 2014. 8 pages.
Hossein Talebi et al., "NIMA: Neural image assessment," IEEE Transactions on Image Processing, vol. 27, No. 8, Aug. 2018, pp. 3998-4011. 14 pages.
M.A. Saad et al., "Blind Prediction of Natural Video Quality," IEEE Transaction on Image Processing, vol. 23, No. 3, Mar. 2014, pp. 1352-1365. 14 pages.
Anish Mittal et al., "A completely blind video integrity oracle," IEEE Transactions on Image Processing, vol. 25, No. 1, Jan. 2016, pp. 289-300. 12 pages.
Anish Mittal et al., "No-reference image quality assessment in the spatial domain," IEEE Transactions on image processing, vol. 21, No. 12, Dec. 2012, pp. 4695-4708. 14 pages.
Manish Narwaria et al., "SVD-based quality metric for image and video using machine learning," IEEE Transactions on Systems, Man, and Cybernetics, Part B (Cybernetics), vol. 42, No. 2, Apr. 2012, pp. 347-364. 18 pages.
Maria Plakia et al., "On user-centric analysis and prediction of QoE for video streaming using empirical measurements," In 2016 Eighth International Conference on Quality of Multimedia Experience (QoMEX), pp. 1-6. EEE, 2016. 6 pages.
Yuming Li et al., "No-reference video quality assessment with 3D shearlet transform and convolutional neural networks," IEEE Transactions on Circuits and Systems for Video Technology, vol. 26, No. 6, Jun. 2016, pp. 1044-1057. 14 pages.
Yu Zhang et al., "Blind video quality assessment with weakly supervised learning and resampling strategy," IEEE Transactions on Circuits and Systems for Video Technology, 2018. 10 pages.
Domonkos Varga et al., "No. reference video quality assessment via pretrained CNN and LSTM networks," Signal, Image and Video Processing, 2019, pp. 1-8. 8 pages.
Mallesham Dasari et al., "Handcrafted vs Deep Learning Classification for Scalable Video QoE Modeling," arXiv preprint arXiv:1901.03404v1, Jan. 10, 2019. 14 pages.
Dingquan Li et al., "Quality Assessment of In-the-Wild Videos," In Proceedings of the 27th ACM International Conference on Multimedia (MM '19), Oct. 21-25, 2019, pp. 2351-2359. 9 pages.
Yueting Zhuang et al., "Adaptive key frame extraction using unsupervised clustering," In Proceedings 1998 International Conference on Image Processing. ICIP98 (Cat. No. 98CB36269), vol. 1, pp. 866-870. IEEE, 1998. 5 pages.

* cited by examiner

VIDEO COMPARISON METHOD AND APPARATUS, COMPUTER DEVICE, AND STORAGE MEDIUM

CROSS-REFERENCES TO RELATED APPLICATIONS

This application is a continuation application of PCT Patent Application No. PCT/CN2020/122626, entitled "VIDEO COMPARISON METHOD AND APPARATUS, COMPUTER DEVICE AND STORAGE MEDIUM" and filed on Oct. 22, 2020, which claims priority to Chinese Patent Application No. 202010187813. 1, entitled "VIDEO COMPARISON METHOD AND APPARATUS, COMPUTER DEVICE, AND STORAGE MEDIUM" filed with the China National Intellectual Property Administration on Mar. 17, 2020, the entire contents of both of which are incorporated herein by reference.

FIELD OF THE TECHNOLOGY

The present disclosure relates to the field of image processing technologies, and specifically, to a video comparison method and apparatus, a computer device, and a storage medium.

BACKGROUND OF THE DISCLOSURE

In the related art, the method for evaluating video definition is basically carried out for a single video. If two videos are compared based on this method for evaluating video definition, the accuracy of a definition difference between the two videos cannot be guaranteed.

SUMMARY

According to embodiments provided in the present disclosure, a video comparison method and apparatus, a computer device, and a storage medium are provided.

A video comparison method is provided, performed by a computer device, the method including: obtaining a first video and a second video; obtaining a first image sequence from the first video, and obtaining a second image sequence from the second video; extracting a first definition feature vector of the first image sequence by using a first feature extraction mechanism of a video comparison model; extracting a second definition feature vector of the second image sequence by using a second feature extraction mechanism of the video comparison model, the first feature extraction mechanism being the same as the second feature extraction mechanism; and determining a definition difference between the first video and the second video based on the first definition feature vector and the second definition feature vector by using a definition difference analysis mechanism of the video comparison model.

A video comparison apparatus is provided, including: an obtaining unit, configured to obtain a first video and a second video; a sequence extraction unit, configured to obtain a first image sequence from the first video, and obtain a second image sequence from the second video; a first feature extraction unit, configured to extract a first definition feature vector of the first image sequence by using a first feature extraction mechanism of a video comparison model; a second feature extraction unit, configured to extract a second definition feature vector of the second image sequence by using a second feature extraction mechanism of the video comparison model, the first feature extraction mechanism being the same as the second feature extraction mechanism; and a definition difference analysis unit, configured to determine a definition difference between the first video and the second video based on the first definition feature vector and the second definition feature vector by using a definition difference analysis mechanism of the video comparison model.

A non-transitory storage medium storing computer-readable instructions is provided, the computer-readable instructions, when executed by one or more processors, causing the one or more processors to perform: obtaining a first video and a second video; obtaining a first image sequence from the first video, and obtaining a second image sequence from the second video; extracting a first definition feature vector of the first image sequence by using a first feature extraction mechanism of a video comparison model; extracting a second definition feature vector of the second image sequence by using a second feature extraction mechanism of the video comparison model, the first feature extraction mechanism being the same as the second feature extraction mechanism; and determining a definition difference between the first video and the second video based on the first definition feature vector and the second definition feature vector by using a definition difference analysis mechanism of the video comparison model.

A computer device is provided, including a memory and a processor, the memory storing computer readable instructions, the computer readable instructions, when executed by the processor, causing the processor to perform the steps of the video comparison method.

Details of one or more embodiments of the present disclosure are provided in the accompanying drawings and descriptions below. Other features, objectives, and advantages of the present disclosure are illustrated in the specification, the accompanying drawings, and the claims.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person skilled in the art may still derive other drawings from these accompanying drawings without creative efforts.

DESCRIPTION OF EMBODIMENTS

Figure 1:
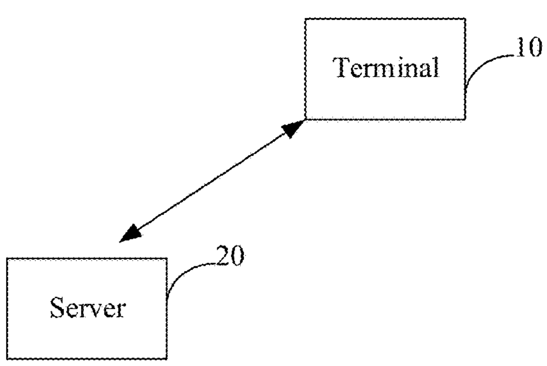
FIG. 1 is a schematic scenario diagram of a video comparison method according to an embodiment of the present disclosure.

The technical solutions in the embodiments of the present disclosure are clearly and completely described below with reference to the accompanying drawings in the embodiments of the present disclosure. Apparently, the described embodiments are merely some rather than all of the embodiments of the present disclosure. All other embodiments obtained by a person skilled in the art based on the embodiments of the present disclosure without creative efforts shall fall within the protection scope of the present disclosure.

Artificial Intelligence (AI) is a theory, a method, a technology, and an application system that use a digital computer or a machine controlled by the digital computer to simulate, extend, and expand human intelligence, perceive an environment, obtain knowledge, and use knowledge to obtain an optimal result. In other words, AI is a comprehensive technology of computer science, which attempts to understand the essence of intelligence and produce a new type of intelligent machine that can react in a similar way to human intelligence. AI is to study design principles and implementation methods of various intelligent machines, so that the machines have the functions of perception, reasoning, and decision-making.

The AI technology is a comprehensive discipline, covering a wide range of fields including both hardware-level technologies and software-level technologies. The basic AI technology generally includes technologies such as sensors, dedicated AI chips, cloud computing, distributed storage, big data processing technologies, operating/interaction systems, and mechatronics. AI software technologies mainly include a computer vision technology, a speech processing technology, a natural language processing technology, machine learning/deep learning (DL), and the like.

Computer vision (CV) is a science that studies how to use a machine to "see", and furthermore, that uses a camera and a computer to replace human eyes to perform machine vision such as recognition, tracking, and measurement on an object, and further perform graphic processing, so that the computer processes the object into an image more suitable for human eyes to observe, or an image transmitted to an instrument for detection. As a scientific subject, the CV studies related theories and technologies and attempts to establish an AI system that can obtain information from images or multidimensional data. The CV technologies generally include technologies such as image processing, image recognition, image semantic understanding, image retrieval, optical character recognition (OCR), video processing, video semantic understanding, video content/behavior recognition, three-dimensional object reconstruction, a 3D technology, virtual reality, augmented reality, synchronous positioning, and map construction, and further include biometric feature recognition technologies such as common face recognition and fingerprint recognition.

Machine learning (ML) is a multi-field inter-discipline, and relates to a plurality of disciplines such as the probability theory, statistics, the approximation theory, convex analysis, and the algorithm complexity theory. ML specializes in studying how a computer simulates or implements a human learning behavior to obtain new knowledge or skills, and reorganize an existing knowledge structure, so as to keep improving performance of the computer. ML is the core of AI, is a basic way to make the computer intelligent, and is applied to various fields of AI. ML and DL generally include technologies such as an artificial neural network, a belief network, reinforcement learning, transfer learning, inductive learning, and learning from demonstrations.

With the research and progress of the AI technology, the AI technology is studied and applied to a plurality of fields, such as a common smart home, a smart wearable device, a virtual assistant, a smart speaker, smart marketing, unmanned driving, automatic driving, an unmanned aerial vehicle, a robot, smart medical care, and smart customer service. It is believed that with the development of technologies, the AI technology will be applied to more fields, and play an increasingly important role.

The solutions provided in the embodiments of the present disclosure involve technologies such as CV and ML/DL of AI, and are specifically described by using the following embodiments.

The embodiments of the present disclosure provide a video comparison method and apparatus, a computer device, and a storage medium. Specifically, this embodiment provides a video comparison method suitable for a video comparison apparatus, and the video comparison apparatus may be integrated into a computer device.

The computer device may be a device such as a terminal. For example, the computer device may be a mobile phone, a tablet computer, or a notebook computer, a desktop computer, or the like.

The computer device may be alternatively a device such as a server. The server may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence (AI) platform, but is not limited thereto.

The video comparison method in this embodiment may be implemented by a terminal or a server, or may be implemented by a terminal and a server jointly.

The video comparison method is described below by taking the terminal and the server jointly implementing the video comparison method as an example.

Referring to FIG. 1, a video comparison system provided in this embodiment of the present disclosure includes a terminal 10, a server 20, and the like. The terminal 10 and the server 20 are connected through a network, for example, through a wired or wireless network, where a video comparison apparatus on the terminal may be integrated in the terminal in the form of a client.

The terminal 10 may be configured to obtain a first video and a second video, and send, to the server, the first video and the second video, and a comparison instruction instructing the server to perform video comparison.

The server 20 may be configured to: receive the first video and the second video, and the comparison instruction, obtain a first image sequence from the first video, and obtain a second image sequence from the second video; extract a first definition feature vector of the first image sequence by using a first feature extraction mechanism of a video comparison model; extract a second definition feature vector of the second image sequence by using a second feature extraction mechanism of the video comparison model, the first feature extraction mechanism being the same as the second feature extraction mechanism; and determine a definition difference between the first video and the second video based on the first definition feature vector and the second definition feature vector by using a definition difference analysis mechanism of the video comparison model, and send the definition difference to the terminal 10.

Detailed descriptions are separately provided below. A description order of the following embodiments is not construed as a limitation on a preferred order of the embodiments.

Figure 2:
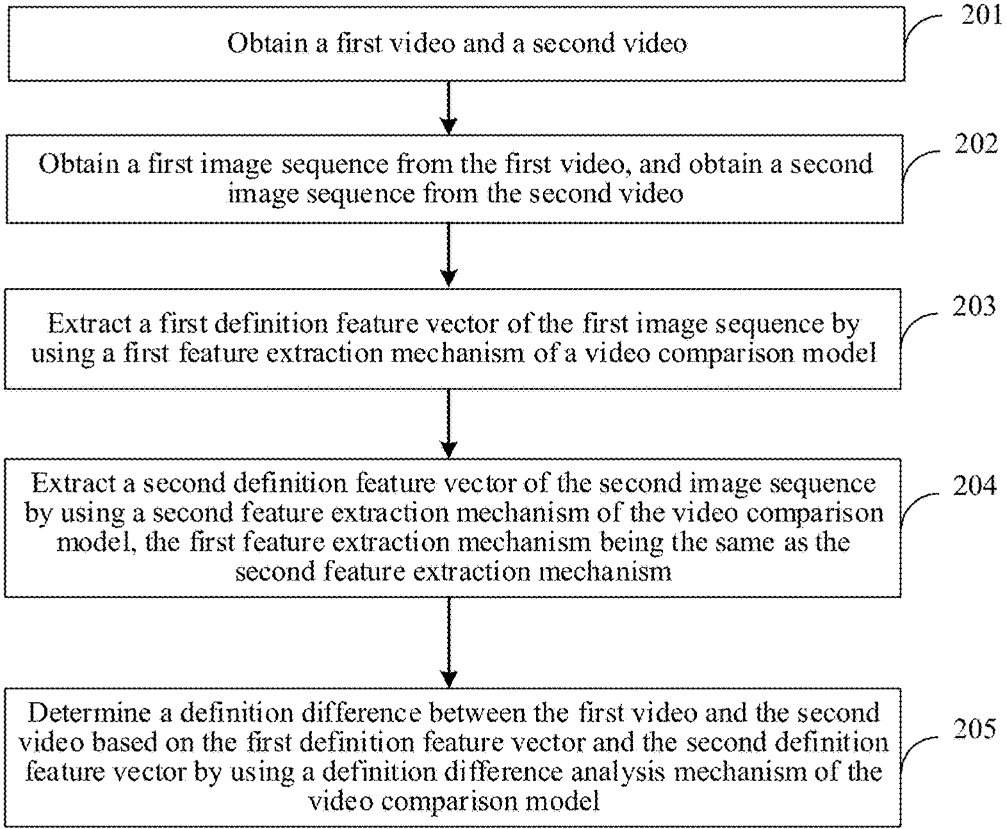
FIG. 2 is a flowchart of a video comparison method according to an embodiment of the present disclosure.

A description is made in this embodiment of the present disclosure from the perspective of the video comparison apparatus. The video comparison apparatus may be specifically integrated in the terminal. An embodiment of the present disclosure provides a video comparison method. The method may be performed by a processor of the terminal. As shown in FIG. 2, a process of the video comparison method may be as follows:

201: Obtain a first video and a second video.

Video transcoding manners used for the first video and the second video in this embodiment may be the same or different, and this is not limited in this embodiment. Video formats of the first video and the second video may be the same or different, for example, the video formats include, but are not limited to, rmvb, mpeg1-4, mov, and the like. Durations of the first video and the second video, quantities of image frames included, and the like may be different. The first video and the second video may be any one of a landscape video or a portrait video, and this is not limited in this embodiment.

In an embodiment, the first video and the second video may be videos captured by a video client. The video client in this embodiment may be understood as a client that provides a user with a video capturing portal, including but not limited to an instant messaging client, a short video client, and the like.

In this embodiment, the first video and the second video may be derived from a same original video.

In an embodiment, the step of "obtaining a first video and a second video" may include: obtaining an original video; converting the original video according to a first video transcoding manner, to obtain the first video; and converting the original video according to a second video transcoding manner, to obtain the second video. The first video transcoding manner and the second video transcoding manner may be transcoding manners provided by different video clients.

The original video in this embodiment may be captured by the terminal in real time through a camera, or may be obtained from a local video library of the terminal.

In an embodiment, the step of "obtaining an original video" may include: shooting a video as the original video through the camera of the terminal.

In an embodiment, the step of "obtaining an original video" may alternatively include: selecting a video from videos locally stored in the terminal as the original video.

In this embodiment, the video definition may be compared between two video clients through the solution of this embodiment.

In an embodiment, the step of "converting the original video according to a first video transcoding manner, to obtain the first video" may include: converting the original video based on the first video transcoding manner provided by a to-be-evaluated video client, to obtain the first video; and "converting the original video according to a second video transcoding manner, to obtain the second video" may include: converting the original video based on the second video transcoding manner provided by a reference video client of the to-be-evaluated video client, to obtain the second video.

In this embodiment, considering the impact of network transmission on video definition, the first video and the second video may be downloaded from the network through the video client.

The reference video client may be a competing video client of the to-be-evaluated video client.

In an embodiment, the step of "obtaining a first video and a second video" may include: after logging in the to-be-evaluated video client, downloading a video as the first video on the to-be-evaluated video client; and after logging in the reference video client of the to-be-evaluated video client, downloading a video as the second video on the reference video client.

In an embodiment, the original video may be converted on two different video clients first, and the converted videos may be then downloaded from the video clients to perform the video comparison in this embodiment.

In an embodiment, the step of "converting the original video according to a second video transcoding manner, to obtain the second video" may include: converting the original video based on the first video transcoding manner provided by a to-be-evaluated video client, to obtain a first converted video; publishing the first converted video through the to-be-evaluated video client; and downloading the first converted video from the to-be-evaluated video client, where the downloaded first converted video is used as the first video.

In an embodiment, the step of "converting the original video according to a first video transcoding manner, to obtain the first video" may include: converting the original video based on the second video transcoding manner provided by the competing video client of the to-be-evaluated video client, to obtain a second converted video; publishing the second converted video through the competing video client; and downloading the second converted video from the competing video client, where the downloaded second converted video is used as the second video.

In this embodiment, the to-be-evaluated video client and the competing client may be installed on the terminal. The method of this embodiment may be implemented by a video comparison apparatus, and the video comparison apparatus may be integrated on the terminal in the form of a client. The video comparison apparatus may call these video clients through application interfaces of the to-be-evaluated video client and the competing video client.

After the original video is obtained, a comparative analysis trigger page may be displayed. The comparative analysis trigger page may include a selection list of the to-be-evaluated video client and a selection list of the competing video client.

After the user selects the to-be-evaluated video client and the competing video client, the to-be-evaluated video client may be called through the application interface of the to-be-evaluated video client to convert the original video according to the first video transcoding manner, to obtain the first video, and the second video transcoding manner provided by the competing video client is called through the application interface of the competing video client to convert the original video, to obtain the second video.

In this way, the first video and the second video may be obtained automatically.

In an embodiment, the first video and the second video may be alternatively obtained by manually inputting the original video to the to-be-evaluated video client and the competing video client.

202: Obtain a first image sequence from the first video, and obtain a second image sequence from the second video.

In this embodiment, in the first image sequence and the second image sequence, quantities of frames of images may be the same or different. In some embodiments, the first image sequence and the second image sequence have the same quantity of frames of images.

The first image sequence and the second image sequence may be obtained by extracting image frames from the first video and the second video respectively.

In an embodiment, the step of "obtaining a first image sequence from the first video, and obtaining a second image sequence from the second video" may include: extracting a preset quantity of first images from the first video, to form the first image sequence; and extracting, from the second video, second images having same positions as the first images in the first video, to form the second image sequence.

The preset quantity may be set as required, for example, may be 20 or 30.

Further, the manner of extracting images from the first video and the second video is not limited. For example, the images may be randomly extracted, or may be extracted at a preset frame quantity interval, for example, a preset quantity of images are extracted at a preset frame quantity interval from the first frame in the video.

In this embodiment, when the first video and the second video are of the same source, in some embodiments, corresponding images in the first image sequence and the second image sequence are at same positions in the first video and the second video.

For example, it is assumed that first images with serial numbers 1, 3, 7, 9, and 11 are extracted from the first video to form a first image sequence. Second images with serial numbers 1, 3, 7, 9, and 11 are also extracted from the second video to form a second image sequence.

In another embodiment, for the first video and the second video that are of the same source and not of the same source, images may be extracted from the first video and the second video in a manner of key frames, that is, images extracted from the first video and the second video are all key frame images. In some embodiments, an adaptive unsupervised clustering method may be used to extract video key frames.

After the first images and the second images are extracted, the images may be processed, such as scaling processing, to process the first images and the second images into the same size. For example, the first images and the second images are all scaled to 224×224.

203: Extract a first definition feature vector of the first image sequence by using a first feature extraction mechanism of a video comparison model.

204: Extract a second definition feature vector of the second image sequence by using a second feature extraction mechanism of the video comparison model, the first feature extraction mechanism being the same as the second feature extraction mechanism.

The first feature extraction mechanism and the second feature extraction mechanism in this embodiment are the same, including same structures and same parameters. For example, completely same network layer structures are used, and parameters (including weights) in network layers are completely the same.

The video comparison model in this embodiment includes the first feature extraction mechanism, the second feature extraction mechanism, and the definition difference analysis mechanism.

Figure 3A:
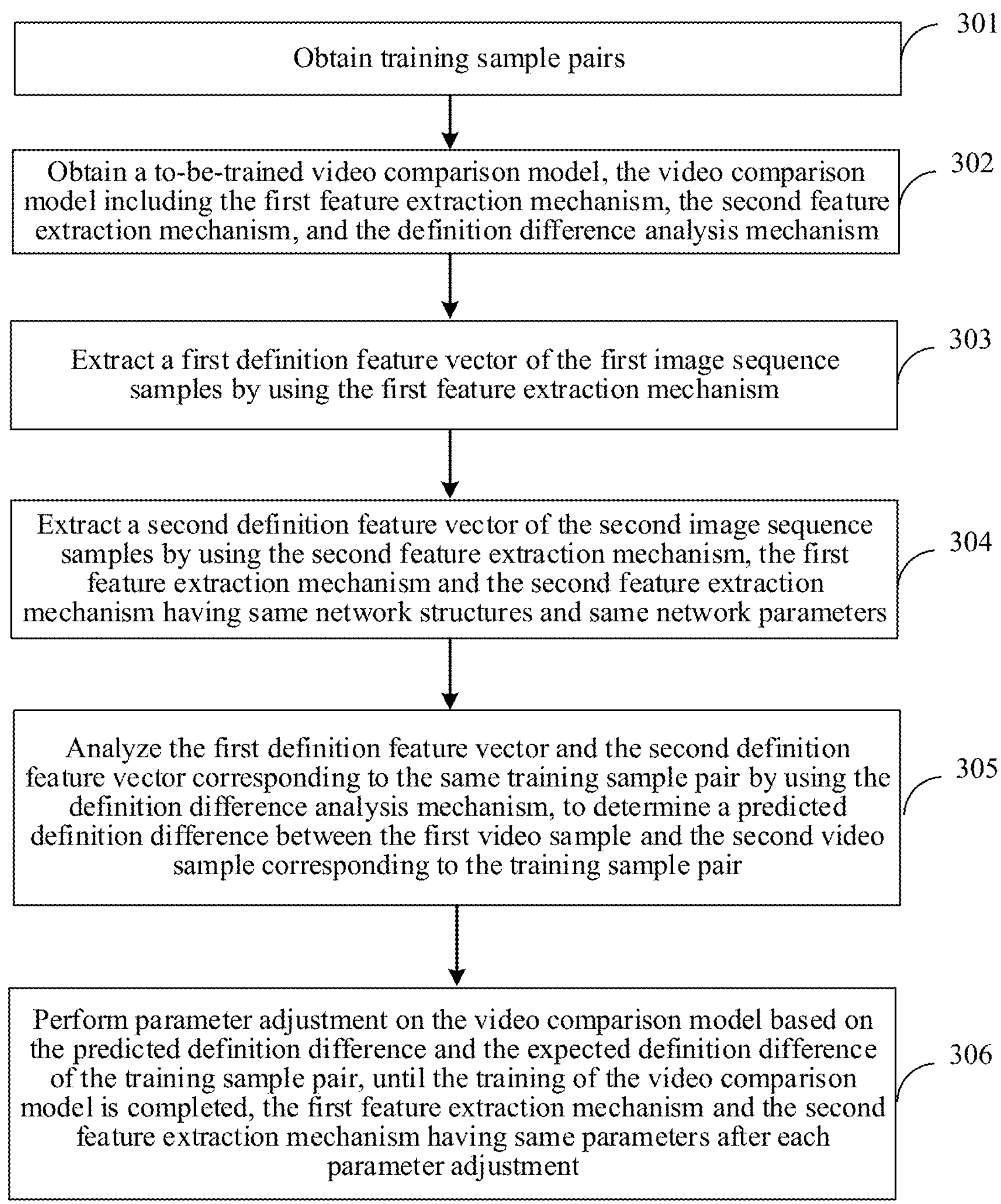
FIG. 3A is a flowchart of a training method of a video comparison model according to an embodiment of the present disclosure.
Figure 3B:
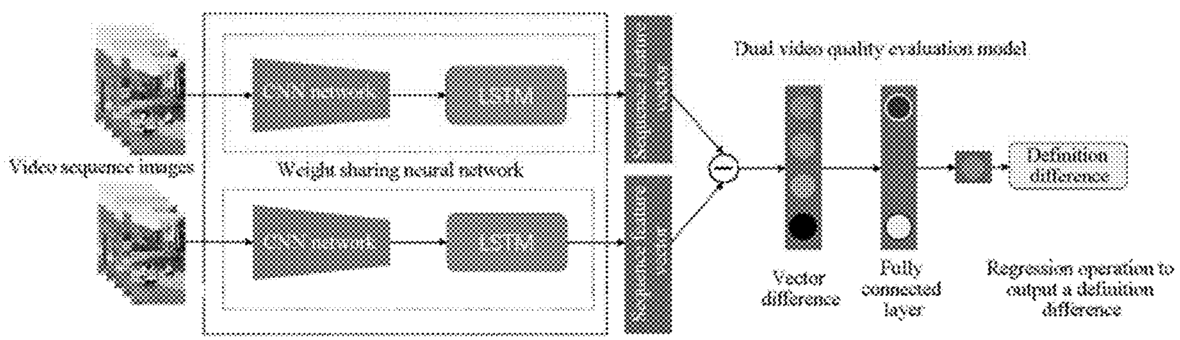
FIG. 3B is a technical framework diagram of a video comparison solution according to an embodiment of the present disclosure.

The training process of the video comparison model is described herein first with reference to FIG. 3A and FIG. 3B.

Before step 201 in this embodiment, the video comparison model may also be trained by using the method shown in FIG. 3A.

Referring to FIG. 3A, the process of video training includes:

301: Obtain training sample pairs, the training sample pairs including first image sequence samples and second image sequence samples, first image sequence samples in a same training sample pair being from a same first video sample, second image sequence samples in the same training sample pair being from a same second video sample, and a sample label of the training sample pair including an expected definition difference between the first video sample and the second video sample.

In this embodiment, for the manner of obtaining the first image sequence sample and the second image sequence sample in the training sample pair, reference may be made to the foregoing process of obtaining the first image sequence and the second image sequence. For example, a preset quantity of images may be extracted by extracting key frames from the first video sample to form the first image sequence samples, and a preset quantity of images may also be extracted by extracting key frames from the second video sample to form the second image sequence samples. The preset quantity may be determined according to the actual situation, for example, 20.

It may be understood that, in this embodiment, for the same video sample, a preset quantity of images may be extracted for a plurality of times to form a plurality of (first or second) image sequence samples. Certainly, it may be understood that, for two image sequence samples extracted from the same video, there are at least one different image frame. Video sources of first image sequence samples and second image sequence samples in a training sample pair may be the same. For example, in a training sample pair, a first video sample and a second video sample may be videos obtained by shooting videos for the same terminal and transcoding the videos using different video transcoding methods.

In this embodiment, after images are extracted from the video samples, some preprocessing may be performed on these images, for example, scaling processing, and the extracted images are scaled to a preset size, such as scaling to a size of 224×224. In this way, sizes of the images in the first image sequence samples and the second image sequence samples are consistent, which facilitates subsequent feature extraction, comparison, and the like.

302: Obtain a to-be-trained video comparison model, the video comparison model including the first feature extraction mechanism, the second feature extraction mechanism, and the definition difference analysis mechanism.

In step 302 of this embodiment, the to-be-trained video comparison model may be established based on the training sample pairs.

The first feature extraction mechanism may include a first feature extraction layer and a second feature extraction layer, and the first feature extraction layer and the second feature extraction layer may learn features of different dimensions. For example, the first feature extraction layer extracts image features, and the second feature extraction layer extracts time series features between image features. Certainly, the first feature extraction mechanism is not limited to the structure of the first feature extraction layer and the second feature extraction layer, and may further have other feasible compositions.

The structure of the first feature extraction layer may be set and adjusted according to actual requirements, and image features extracted by the first feature extraction layer may be multi-dimensional, which is not limited in this embodiment.

For example, after the first feature extraction layer extracts multi-dimensional features for each frame of image, feature fusion may be respectively performed on each frame of image to obtain an image feature of each frame of image, and the fused image feature is inputted into the second feature extraction layer for learning of time sequence relationships.

Since the first feature extraction mechanism and the second feature extraction mechanism are the same, when the first feature extraction mechanism includes the first feature extraction layer and the second feature extraction layer, the second feature extraction mechanism also includes the first feature extraction layer and the second feature extraction layer.

303: Extract a first definition feature vector of the first image sequence samples by using the first feature extraction mechanism.

304: Extract a second definition feature vector of the second image sequence samples by using the second feature extraction mechanism, the first feature extraction mechanism and the second feature extraction mechanism having same network structures and same network parameters.

The first feature extraction mechanism and the second feature extraction mechanism in this embodiment may be implemented based on a neural network.

In an embodiment, the step of "extracting a first definition feature vector of the first image sequence samples by using the first feature extraction mechanism" may include: mapping images in the first image sequence samples from a pixel space to a target embedding space by using the first feature extraction mechanism, to obtain a first image feature vector of the first image sequence samples; and analyzing the first image feature vector based on a time sequence relationship among the images corresponding to the first image feature vector by using the first feature extraction mechanism, to obtain the first definition feature vector of the first image sequence samples.

In an embodiment, the step of "extracting a second definition feature vector of the second image sequence samples by using the second feature extraction mechanism" may include: mapping images in the second image sequence samples from a pixel space to a target embedding space by using the second feature extraction mechanism, to obtain a second image feature vector of the second image sequence samples; and analyzing the second image feature vector based on a time sequence relationship among the images corresponding to the second image feature vector by using the second feature extraction mechanism, to obtain the second definition feature vector of the second image sequence samples.

In this embodiment, the process of obtaining the first image feature vector through the first feature extraction mechanism may specifically include: performing multi-dimensional feature extraction on the images in the first image sequence samples through the first feature extraction mechanism to obtain image feature vectors of a plurality of dimensions, and performing feature fusion on the image feature vectors of a plurality of dimensions of the images, to obtain a fused image feature of the images in the first image sequence sample as the first image feature vector. The target embedding space (that is, a target feature space, which is generally a high-dimensional space) to which the first image feature vector belongs is a combined space formed by a plurality of feature spaces (an image feature vector of each dimension corresponds to a feature space).

Correspondingly, the process of obtaining the second image feature vector through the second feature extraction mechanism may specifically include: performing multi-dimensional feature extraction on the images in the second image sequence samples through the second feature extraction mechanism to obtain image feature vectors of a plurality of dimensions, and performing feature fusion on the image feature vectors of a plurality of dimensions of the images, to obtain a fused image feature of the images in the second image sequence sample as the second image feature vector. The target embedding space (that is, a target feature space, which is generally a high-dimensional space) to which the second image feature vector belongs is a combined space formed by a plurality of feature spaces (an image feature vector of each dimension corresponds to a feature space).

In an image, a pixel is a physical point in a bitmap (or referred to as a grid map), which is represented as the smallest element in image representation. That is, an image may be understood as including pixels one by one. Each pixel has a respective color value and spatial position. The colors and spatial positions of all pixels in the image determine how the image appears. In a neural network, an image may be represented in the format of [h, w, c], where h represents an image height, W represents an image width, and c represents a quantity of image channels. The pixel space in this embodiment may be understood as a three-dimensional space formed by h, w, and c.

The images in this embodiment may use any image mode. The image mode may be understood as decomposing a color into some color components, and different classifications of the color components form different color modes. Color ranges defined by different color modes are different, and quantities of image channels corresponding to different color modes may also be different. For example, a quantity of image channels corresponding to an image in an RGB mode is 3, and a quantity of image channels corresponding to an image in an Alpha mode may be 4.

In this embodiment, the first image feature vector and the second image feature vector may be extracted by the first feature extraction layer, and the first definition feature vector and the second definition feature vector may be extracted by the second feature extraction layer.

In this embodiment, the images are mapped from the pixel space to the target embedding space, which may be understood as feature extraction on the images. The target embedding space may be understood as a feature space in which the second image feature vector obtained after the feature extraction on the images is located. The feature space varies according to the feature extraction manner.

In some embodiments, in this embodiment, the first feature extraction layer may be any network layer with an image feature extraction function, which may be implemented based on any available network structure, for example, may be implemented based on a convolutional neural network (CNN). In this embodiment, the second feature extraction layer may be any network with a time series feature extraction function, which may be implemented based on any available network structure, for example, may be implemented based on a cyclic neural network structure.

Referring to FIG. 3B, the first feature extraction layer may be implemented based on the CNN, and the second feature extraction layer may be implemented based on a recurrent neural network, such as a long short-term memory (LSTM) network.

In this embodiment, the first feature extraction layer may use ResNet50 (in other examples, other CNN networks may be used) as a backbone structure for fine-tuning, and use data batching for training.

For a group of sequence frame $I_t \in R^{N \times C \times H \times W}$ data of a video (which may be understood as N first image sequence samples or N second image sequence samples), N is a quantity of batch data samples, C is a quantity of channels of a picture, H is a picture height, and W is a picture width.

In this embodiment, this group of data may be transmitted as an input to the first feature extraction layer, an output of a last fully connected layer of ResNet50 may be extracted as a high-dimensional spatial feature of the current video frame sequence, and a feature dimension of the last fully connected layer is set to 2048 (the dimension of 2048 is only an example, and a total quantity of dimensions may be alternatively set to other values, which is not limited in this embodiment), that is:

$$F_t = CNN(I_t),\ F_t \in R^{N \times 2048} \tag{1}$$

As shown in formula (1), $F_t \in R^{N \times 2048}$ is the high-dimensional sequence feature vector (the first or second image feature vector) of the current video sequence frame, and N represents a quantity of files in the current batch (which may be understood as the quantity of the training sample pairs). The two first feature extraction layers in FIG. 3B share parameters during training.

After the first feature extraction layer completes the feature extraction of the video sequence frame, the high-dimensional feature vector is sent to the second feature extraction layer such as an LSTM module for learning of time series features. The LSTM module may automatically retain useful information in the video sequence frame and output a final video feature vector through a sequence combination of a forget gate, an input gate, and an output gate. The video feature vector is the first or second definition feature vector.

In this embodiment, parameter settings of the LSTM structure are not limited, and may be: a quantity of LSTM cells is 20, corresponding to 20 frames of images extracted from each video; a quantity of neurons in a hidden layer is 512, corresponding to a finally outputted video feature dimension of 512; and an activation function is a Tanh activation function.

In this embodiment, a reship deformation operation is performed on a feature $F_t \in R^{N \times 2048}$ outputted by the first feature extraction layer to obtain $$F_r \in R^{\frac{N}{20} \times 20 \times 2048}$$

(N is a quantity of batch image files), and $F_r$ is then inputted into the LSTM module to calculate a time series feature $F_s$, that is, $$F_s = LSTM(F_r),\ F_s \in R^{\frac{N}{20} \times 512} \tag{2}$$

The time series feature is the first or second definition feature vector.

The two second feature extraction layers such as LSTM layers in FIG. 3B also share parameters during training.

305: Analyze the first definition feature vector and the second definition feature vector corresponding to the same training sample pair by using the definition difference analysis mechanism, to determine a predicted definition difference between the first video sample and the second video sample corresponding to the training sample pair.

In this embodiment, the first feature extraction mechanism and the second feature extraction mechanism are the same (including the same structures and parameters such as weights), so that for two image sequence samples in the same training sample pair, the definition feature vectors used for definition comparative analysis are in the same vector space, which ensures that the two image sequence samples can be compared and analyzed based on the definition feature vectors. In addition, the training sample pair is labeled with the definition difference. Therefore, in the continuous training process of the video comparison model, parameters of the model, such as a weight of a feature, are constantly adjusted based on the predicted definition difference and the expected definition difference, and the definition feature vectors extracted by the model can more and more accurately reflect the definition difference between the videos. Finally, the accuracy of comparative analysis of the video definition by the model is improved to an extent.

In an embodiment, a similarity between the two definition feature vectors may be further calculated, and the definition difference between the first video and the second video is measured through the similarity. The similarity may be represented by Euclidean distance or the like.

In another embodiment, the definition difference may be alternatively analyzed through a vector difference between the two definition feature vectors.

In an embodiment, the step of "analyzing the first definition feature vector and the second definition feature vector corresponding to the same training sample pair by using the definition difference analysis mechanism, to determine a predicted definition difference between the first video sample and the second video sample corresponding to the training sample pair" may include: calculating a vector difference between the first definition feature vector and the second definition feature vector corresponding to the same training sample pair by using the definition difference analysis mechanism; and determining the predicted definition difference between the first video sample and the second video sample corresponding to the training sample pair based on the vector difference of the training sample pair.

In an embodiment, the step of "determining the predicted definition difference between the first video sample and the second video sample corresponding to the training sample pair based on the vector difference of the training sample pair" may include: processing the vector difference of the training sample pair by using a fully connected layer to obtain a one-dimensional vector difference; and normalizing the one-dimensional vector difference, to obtain the predicted definition difference between the first video sample and the second video sample corresponding to the training sample pair.

For example, it is assumed that the first definition feature vector and the second definition feature vector are $F_1$, $F_2$ and $$F_1, F_2 \in R^{\frac{N}{20} \times 512}$$

respectively. A bitwise subtraction operation is performed on $F_1$ and $F_2$ to obtain the vector difference $F_{final}$:

$$F_{final} = F_1 - F_2, F_{final} \in R^{\frac{N}{20} \times 512} \quad (3)$$

After the vector difference is obtained, the vector difference may be classified by using the fully connected layer in the definition difference analysis mechanism. The fully connected layer includes a first fully connected layer and a second fully connected layer, and the first fully connected layer and the first definition feature vector have the same dimension, for example, 512. The dimension of the second fully connected layer is 1.

For example, in the technical framework diagram shown in FIG. 3B, the fully connected layer may include a 512-dimensional fully connected layer $FC_1$ and a one-dimensional fully connected layer $FC_2$. In this embodiment, the first fully connected layer and the second fully connected layer are connected through an activation layer. An activation function of the activation layer may be a non-linear activation function, for example, a rectified linear unit (ReLU) function.

The one-dimensional vector difference is:

$$F_{score} = FC_2(ReLU(FC_1(F_{final}))), F_{score} \in R^{\frac{N}{20} \times 1} \quad (4)$$

The definition difference in this embodiment may be any value between −1 and 1. Referring to FIG. 3B, after the one-dimensional vector difference is calculated, a regression operation, that is, a normalization operation, is performed on the one-dimensional vector difference to obtain the predicted definition difference with a value between −1 and 1. In some embodiments, a function used in the normalization operation may be selected according to actual requirements, for example, selecting the Tanh function. A Tanh normalization activation operation is performed on the one-dimensional vector difference, to output the final definition difference Result.

$$\text{Result} = \text{Tanh}(F_{score}), \text{Result} \in (-1, 1) \quad (5)$$

306: Perform parameter adjustment on the video comparison model based on the predicted definition difference and the corresponding expected definition difference of the training sample pair, until the training of the video comparison model is completed, the first feature extraction mechanism and the second feature extraction mechanism having same parameters after each parameter adjustment.

The parameters of the CNN and the LSTM in FIG. 3B are the same.

The expected definition difference in this embodiment may be obtained by subjective evaluation of the first video sample and the second video sample. For example, the expected definition difference may be a mean value of a mean opinion score (MOS) of the subjective evaluation of the videos.

In this embodiment, a preset loss function may be used to calculate a loss value between the predicted definition difference and the corresponding expected definition difference, and parameter adjustment is performed on the video comparison model based on the loss value.

In an embodiment, the preset loss function may be a mean square error loss function.

In an embodiment, when video definition comparative analysis is performed based on the first image sequence and the second image sequence, the step of "extracting a first definition feature vector of the first image sequence by using a first feature extraction mechanism of a video comparison model" may include: mapping first images in the first image sequence from a pixel space to a target embedding space by using the first feature extraction mechanism, to obtain a first image feature vector of the first image sequence; and analyzing the first image feature vector based on a time sequence relationship among the first images corresponding to the first image feature vector by using the first feature extraction mechanism, to obtain the first definition feature vector corresponding to the first image sequence.

Correspondingly, the step of "extracting a second definition feature vector of the second image sequence by using a second feature extraction mechanism of the video comparison model" may include: mapping second images in the second image sequence from a pixel space to the target embedding space by using the second feature extraction mechanism, to obtain a second image feature vector of the second image sequence; and analyzing the second image feature vector based on a time sequence relationship among the second images corresponding to the second image feature vector by using the second feature extraction mechanism, to obtain the second definition feature vector corresponding to the second image sequence.

For the specific steps of extracting the first definition vector and the second definition vector, reference may be made to the description in the foregoing model training process.

205: Determine a definition difference between the first video and the second video based on the first definition feature vector and the second definition feature vector by using a definition difference analysis mechanism of the video comparison model.

In some embodiments, the video comparison model in this embodiment may be a model with an end-to-end network structure, where the input is the image sequences, and the output is the definition difference. In this way, not only the definition difference between the videos can be qualified, but also the problems of high training difficulty and cumbersome deployment of models with non-end-to-end network structures can be effectively resolved.

The definition difference in this embodiment may be positive or negative or zero. A value of zero may indicate that the definition of the first video is the same as the definition of the second video, a positive value may indicate that the definition of the first video is higher than that of the second video, and a negative value may indicate that the definition of the first video is lower than that of the second video.

In an embodiment, the step of "determining a definition difference between the first video and the second video based on the first definition feature vector and the second definition feature vector by using a definition difference analysis mechanism of the video comparison model" may include: calculating a similarity between the first definition feature vector and the second definition feature vector by using the definition difference analysis mechanism of the video comparison model; and determining the definition difference between the first video and the second video based on the similarity.

The similarity may be represented by vector distance between vectors, such as Euclidean distance.

In an embodiment, the step of "determining a definition difference between the first video and the second video based on the first definition feature vector and the second definition feature vector by using a definition difference analysis mechanism of the video comparison model" may include: calculating a vector difference between the first definition feature vector and the second definition feature vector by using the definition difference analysis mechanism of the video comparison model; and determining the definition difference between the first video and the second video based on the vector difference.

For the specific calculation process of the definition difference, reference may be made to the relevant description in the model training solution.

The definition difference analysis mechanism of this embodiment includes fully connected layers, and there is at least one fully connected layer.

The step of "determining the definition difference between the first video and the second video based on the vector difference" may include: processing the vector difference by using the fully connected layer to obtain a one-dimensional vector difference; and normalizing the one-dimensional vector difference, to obtain the definition difference between the first video and the second video.

For example, similar to the example in the model training solution, it is assumed that the first definition feature vector and the second definition feature vector are $F_1$, $F_2$ respectively. A bitwise subtraction operation is performed on $F_1$ and $F_2$ to obtain the vector difference $F_{final}$:

$$F_{final} = F_1 - F_2.$$

The definition difference may be obtained based on the processing of the vector difference by the fully connected layer. The quantity of fully connected layers included in the fully connected layer in this embodiment is not limited. Similarly, the first fully connected layer $FC_1$ and the second fully connected layer $FC_2$ shown in FIG. 3B may be included. The first fully connected layer and the second fully connected layer are connected through an activation layer. An activation function of the activation layer may be a non-linear activation function, for example, a rectified linear unit (ReLU) function. The one-dimensional vector difference is $F_{score}=FC_2(ReLU(FC_1(F_{final})))$.

Certainly, in another embodiment, the foregoing ReLU function may be further replaced with other available activation functions.

In this embodiment, the second video transcoding manner may be used as a preset reference video transcoding manner.

After the definition difference between the first video and the second video is determined based on the first definition feature vector and the second definition feature vector by using the definition difference analysis mechanism of the video comparison model, a transcoding performance level of the first video transcoding manner compared to the preset reference video transcoding manner may be further analyzed based on the definition difference.

For example, a correspondence between the definition difference and the transcoding performance level is set. If the definition difference is in a range of −1 to 0 (excluding 0), the first video transcoding manner is inferior to the second video transcoding manner, and if the definition difference is in a range of 0 to 1 (excluding 0), the first video transcoding manner is superior to the second video transcoding manner.

The range of −1 to 0 (excluding 0) may be further subdivided into several different ranges, and different inferiority levels are set for each range. A value closer to −1 indicates a higher inferiority level. The range of 0 to 1 (excluding 0) may also be subdivided into several different ranges, and different superiority levels are set for each range. A value closer to 1 indicates a higher superiority level.

In this embodiment, an optimization solution for the foregoing video client to be analyzed may be determined based on the transcoding performance level (especially for the videos of the same source), for example, optimizing or replacing the first video transcoding manner provided by the video client.

For UGC videos, by using the solution of this embodiment, the performance difference with competing video clients can be accurately evaluated, which is beneficial to optimize the client and improve the video quality of the product, thereby improving user experience and attracting more users.

In this embodiment, the camera of the terminal may have a plurality of shooting modes (shooting parameters of different shooting modes are different). In this embodiment, a definition difference corresponding to a plurality of original videos may be obtained through the foregoing solution, where the original videos are considered as being shot by the terminal using the camera, and the total shooting modes of the plurality of original videos are not less than two.

After the definition difference is obtained, the impact of a shooting mode on the definition difference may be further analyzed.

Based on an analysis result, a target shooting mode corresponding to the first video transcoding manner is determined, where in the target shooting mode, the first video is the clearest compared with the second video.

The definition difference between the first video and the second video may be positive (the first video is clearer) or negative (the second video is clearer). If there is a positive value in the definition difference, in the target shooting mode, the first video and the second video obtained in the second video transcoding manner (for example, of the competing client) have the largest definition difference (which is also a positive value); and if there is no positive value in the definition difference, in the target shooting mode, the first video and the second video obtained in the second video transcoding manner (for example, of the competing client) have the smallest definition difference (which is also a negative value).

This embodiment provides a video comparison method, including: obtaining a first video and a second video; obtaining a first image sequence from the first video, and obtaining a second image sequence from the second video; extracting a first definition feature vector of the first image sequence by using a first feature extraction mechanism of a video comparison model; and extracting a second definition feature vector of the second image sequence by using a second feature extraction mechanism of the video comparison model. The first feature extraction mechanism and the second feature extraction mechanism in this embodiment are the same, and the definition feature vectors of the two image sequences extracted by the two modules can more accurately reflect the relative definition of the two videos. After the feature vectors are extracted, a definition difference analysis mechanism of the video comparison model may be used to determine a definition difference between the first video and the second video based on the first definition feature vector and the second definition feature vector, implementing the quantification of the definition difference between the two videos. This embodiment is based on the analysis of the definition feature vectors, which is beneficial to improve the accuracy of the analysis of the definition difference between the videos.

Further, in this embodiment, two videos are inputted into the video comparison model, and then a definition difference between the videos can be outputted. This end-to-end solution is very convenient for model deployment.

Further, the solution of this embodiment may be applied to the automatic analysis of competitive product data at a UGC video recommendation terminal, which can accurately evaluate the performance difference with the competitive product and improve the video quality of the product. In addition, the solution of this embodiment may be further applied to the evaluation of video transcoding technologies, to accurately estimate performance levels of different transcoding technologies, so that the transcoding technologies can make an effective optimization strategy for video definition.

Although the steps in the flowcharts of the embodiments are displayed sequentially according to instructions of arrows, these steps are not necessarily performed sequentially according to a sequence instructed by the arrows. Unless otherwise explicitly specified in this specification, execution of the steps is not strictly limited, and the steps may be performed in other orders. Moreover, at least some of the steps in the foregoing embodiments may include a plurality of sub-steps or a plurality of stages. The sub-steps or the stages are not necessarily performed at the same moment, but may be performed at different moments. The sub-steps or the stages are not necessarily performed in sequence, but may be performed in turn or alternately with another step or at least some of sub-steps or stages of the another step.

To better implement the foregoing method, correspondingly, an embodiment of the present invention further provides a video comparison apparatus, and the video comparison apparatus may be specifically integrated in a terminal.

Figure 4:
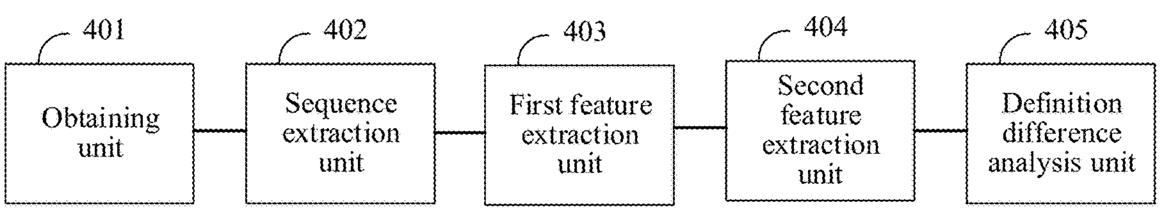
FIG. 4 is a schematic structural diagram of a video comparison apparatus according to an embodiment of the present disclosure.

As shown in FIG. 4, in an embodiment, a video comparison apparatus is provided. Referring to FIG. 9, the video comparison apparatus includes: an obtaining unit 401, a sequence extraction unit 402, a first feature extraction unit 403, a second feature extraction unit 404, and a definition difference analysis unit 405. The modules included in the video comparison apparatus may all or partially be implemented by software, hardware, or a combination thereof.

The obtaining unit 401 is configured to obtain a first video and a second video.

The sequence extraction unit 402 is configured to obtain a first image sequence from the first video, and obtain a second image sequence from the second video.

The first feature extraction unit 403 is configured to extract a first definition feature vector of the first image sequence by using a first feature extraction mechanism of a video comparison model.

The second feature extraction unit 404 is configured to extract a second definition feature vector of the second image sequence by using a second feature extraction mechanism of the video comparison model, the first feature extraction mechanism being the same as the second feature extraction mechanism.

The definition difference analysis unit 405 is configured to determine a definition difference between the first video and the second video based on the first definition feature vector and the second definition feature vector by using a definition difference analysis mechanism of the video comparison model.

In an embodiment, the obtaining unit 401 is further configured to: obtain an original video; convert the original video according to a first video transcoding manner, to obtain the first video; and convert the original video according to a second video transcoding manner, to obtain the second video.

In an embodiment, the obtaining unit 401 is further configured to: convert the original video based on the first video transcoding manner provided by a to-be-evaluated video client, to obtain the first video; and convert the original video based on the second video transcoding manner provided by a reference video client of the to-be-evaluated video client, to obtain the second video.

In an embodiment, the sequence extraction unit 402 is further configured to: extract a preset quantity of first images from the first video, to form the first image sequence; and extract, from the second video, second images having same positions as the first images in the first video, to form the second image sequence.

In an embodiment, the first feature extraction unit 403 is further configured to: map first images in the first image sequence from a pixel space to a target embedding space by using the first feature extraction mechanism, to obtain a first image feature vector of the first image sequence; and analyze the first image feature vector based on a time sequence relationship among the first images corresponding to the first image feature vector by using the first feature extraction mechanism, to obtain the first definition feature vector corresponding to the first image sequence; and the second feature extraction unit 404 is further configured to: map second images in the second image sequence from a pixel space to the target embedding space by using the second feature extraction mechanism, to obtain a second image feature vector of the second image sequence; and analyze the second image feature vector based on a time sequence relationship among the second images corresponding to the second image feature vector by using the second feature extraction mechanism, to obtain the second definition feature vector corresponding to the second image sequence.

In an embodiment, the definition difference analysis unit 403 is further configured to: calculate a vector difference between the first definition feature vector and the second definition feature vector by using the definition difference analysis mechanism of the video comparison model; and determine the definition difference between the first video and the second video based on the vector difference.

In an embodiment, the second video transcoding manner is a preset reference video transcoding manner; and the video comparison apparatus in this embodiment further includes a transcoding performance analysis unit, configured to analyze, after the definition difference analysis unit determines a definition difference between the first video and the second video based on the first definition feature vector and the second definition feature vector by using a definition difference analysis mechanism of the video comparison model, a transcoding performance level of the first video transcoding manner compared to the preset reference video transcoding manner based on the definition difference.

In an embodiment, the video comparison apparatus in this embodiment further includes a training unit, configured to: obtain training sample pairs before the first definition feature vector of the first image sequence is extracted by using the first feature extraction mechanism of the video comparison model, the training sample pairs including first image sequence samples and second image sequence samples, first image sequence samples in a same training sample pair being from a same first video sample, second image sequence samples in the same training sample pair being from a same second video sample, and a sample label of the training sample pair including an expected definition difference between the corresponding first video sample and second video sample; obtain a to-be-trained video comparison model, the video comparison model including the first feature extraction mechanism, the second feature extraction mechanism, and the definition difference analysis mechanism; extract a first definition feature vector of the first image sequence samples by using the first feature extraction mechanism; extract a second definition feature vector of the second image sequence samples by using the second feature extraction mechanism, the first feature extraction mechanism and the second feature extraction mechanism having same network structures and same network parameters; analyze the first definition feature vector and the second definition feature vector corresponding to the same training sample pair by using the definition difference analysis mechanism, to determine a predicted definition difference between the first video sample and the second video sample corresponding to the training sample pair; and performing parameter adjustment on the video comparison model based on the predicted definition difference and the corresponding expected definition difference of the training sample pair, until the training of the video comparison model is completed, the first feature extraction mechanism and the second feature extraction mechanism having same parameters after each parameter adjustment.

In an embodiment, the training unit is further configured to: map images in the first image sequence samples from a pixel space to a target embedding space by using the first feature extraction mechanism, to obtain a first image feature vector of the first image sequence samples; analyze the first image feature vector based on a time sequence relationship among the images corresponding to the first image feature vector by using the first feature extraction mechanism, to obtain the first definition feature vector of the first image sequence samples; map images in the second image sequence samples from a pixel space to the target embedding space by using the second feature extraction mechanism, to obtain a second image feature vector of the second image sequence samples; and analyze the second image feature vector based on a time sequence relationship among the images corresponding to the second image feature vector by using the second feature extraction mechanism, to obtain the second definition feature vector of the second image sequence samples.

In an embodiment, the training unit is further configured to: calculate a vector difference between the first definition feature vector and the second definition feature vector corresponding to the same training sample pair by using the definition difference analysis mechanism; and determine the predicted definition difference between the first video sample and the second video sample corresponding to the training sample pair based on the vector difference of the training sample pair.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

By using the solution of this embodiment, accurate and effective definition comparison analysis can be performed on a video, which improves the accuracy of the definition analysis of an unreferenced video to an extent. In addition, the end-to-end solution facilitates the deployment of a model.

Figure 5:
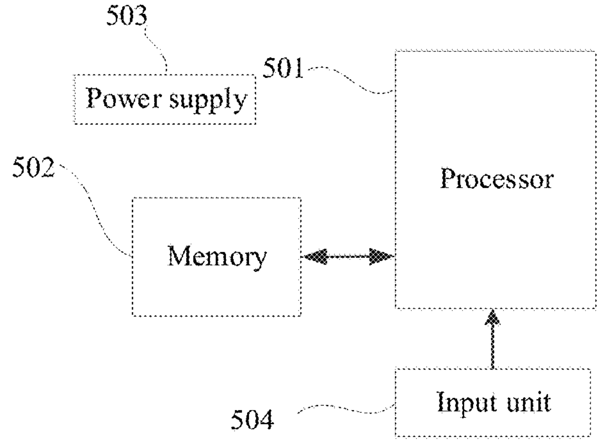
FIG. 5 is a schematic structural diagram of a computer device according to an embodiment of the present disclosure.

In addition, an embodiment of the present invention further provides a computer device. The computer device may be a terminal or a server. FIG. 5 is a schematic structural diagram of a computer device according to an embodiment of the present invention. Specifically, the computer device may include components such as a processor 501 including one or more processing cores, a memory 502 including one or more computer-readable storage media, a power supply 503, and an input unit 504. A person skilled in the art may understand that, the structure of the computer device shown in FIG. 5 does not constitute a limitation to the computer device. The computer device may include components that are more or fewer than those shown in the figure, or some components may be combined, or a different component deployment may be used.

The processor 501 is a control center of the computer device, and connects to various parts of the entire computer device by using various interfaces and lines. By running or executing software programs and/or modules stored in the memory 502, and invoking data stored in the memory 502, the processor performs various functions and data processing of the computer device, thereby performing overall monitoring on the computer device. In some embodiments, the processor 501 may include one or more processing cores. Preferably, the processor 501 may integrate an application processor and a modem processor. The application processor mainly processes an operating system, a user interface, an application, and the like. The modem processor mainly processes wireless communication. It may be understood that the foregoing modem processor may alternatively not be integrated into the processor 501.

The memory 502 may be configured to store a software program and a module, and the processor 501 runs the software program and the module that are stored in the memory 502, to implement various functional applications and data processing. The memory 502 may mainly include a program storage area and a data storage area. The program storage area may store an operating system, an application required by at least one function (for example, a sound playback function and an image playback function), or the like. The data storage area may store data created according to use of the computer device. In addition, the memory 502 may include a high speed random access memory, and may also include a non-volatile memory, such as at least one magnetic disk storage device, a flash memory, or another volatile solid-state storage device. Correspondingly, the memory 502 may further include a memory controller, to allow the processor 501 to access the memory 502.

The computer device further includes the power supply 503 supplying power to the components. Preferably, the power supply 503 may be logically connected to the processor 501 by using a power management system, thereby implementing functions such as charging, discharging, and power consumption management by using the power management system. The power supply 503 may further include one or more of a direct current or alternating current power supply, a re-charging system, a power failure detection circuit, a power supply converter or inverter, a power supply state indicator, and any other component.

The computer device may further include the input unit 504. The input unit 504 may be configured to receive entered numeric or character information and generate keyboard, mouse, joystick, optical, or trackball signal input related to user settings and function control.

Although not shown in the figure, the computer device may further include a display unit, and the like. Details are not described herein again.

The system involved in the embodiments of the present invention may be a distributed system formed by connecting a client to a plurality of nodes (computer devices in any form in an access network, for example, servers and terminals) in a network communication form.

Figure 6:
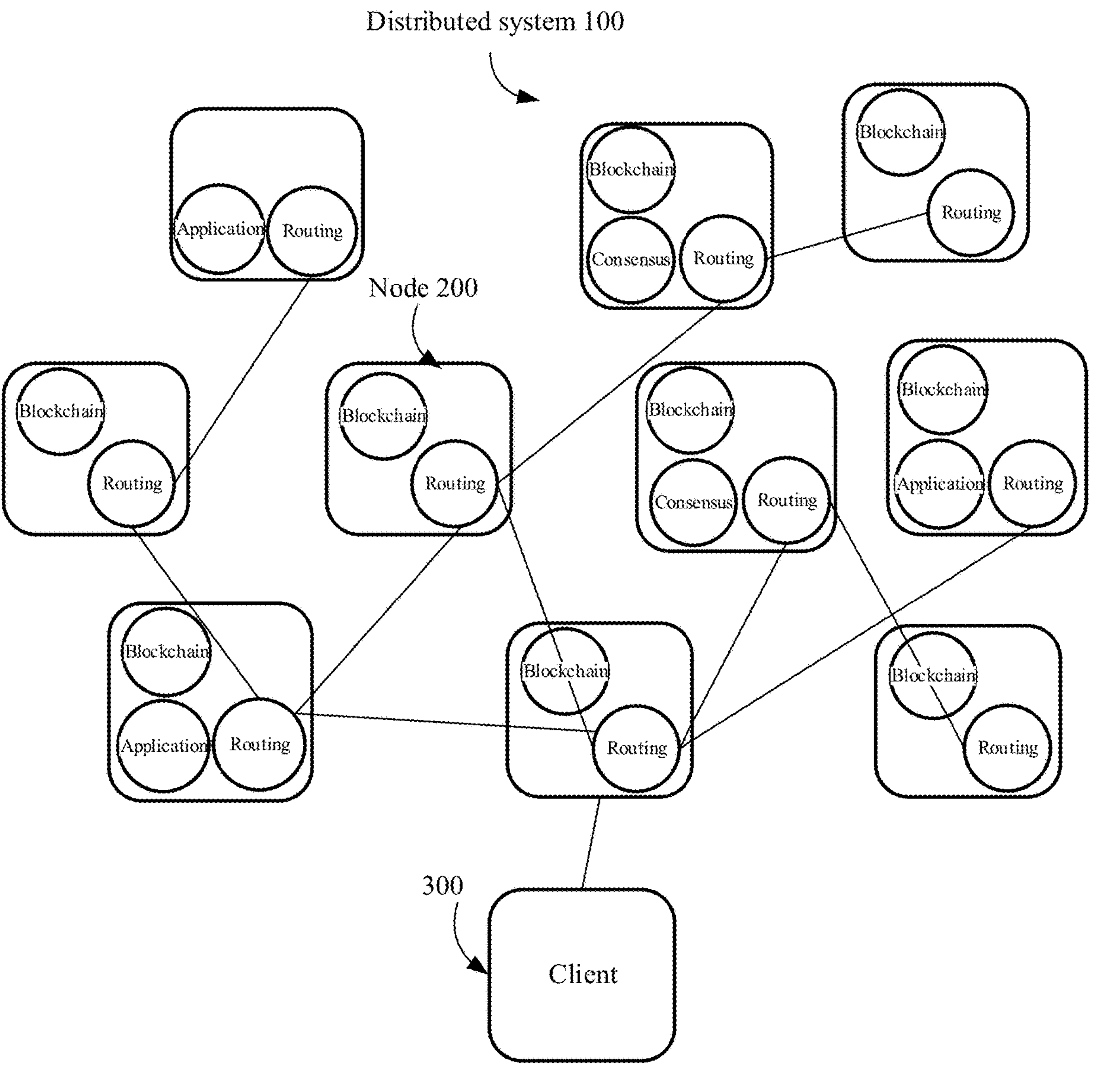
FIG. 6 is an example schematic structural diagram of a distributed system 100 applied to a blockchain system according to an embodiment of the present disclosure.

For example, the distributed system is a blockchain system. FIG. 6 is an example schematic structural diagram of a distributed system 100 applied to a blockchain system according to an embodiment of the present invention. The distributed system is formed by a plurality of nodes (computing devices in any form in an access network, such as, servers and user terminals) and a client. A peer-to-peer (P2P) network is formed between the nodes. The P2P protocol is an application-layer protocol running over the Transmission Control Protocol (TCP). Any machine such as a server or a terminal may be added to the distributed system to become a node. The nodes include a hardware layer, an intermediate layer, an operating system layer, and an application layer. In this embodiment, the original video, the first video, the second video, the training sample pair, the first video sample, the second video sample, the definition difference, and the like may be all stored in a shared ledger of the blockchain system by nodes. The computer device (for example, a terminal or a server) may obtain the definition difference based on recorded data stored in the shared ledger.

Referring to functions of each node in the blockchain system shown in FIG. 6, the related functions include the following:

(1) Routing: which is a basic function of a node, and is used for supporting communication between nodes.

In addition to the routing function, the node may further have the following functions:

(2) Application: which is deployed in a blockchain, and is used for implementing a particular service according to an actual service requirement, recording data related to function implementation to form recorded data, adding a digital signature to the recorded data to indicate a source of task data, and transmitting the recorded data to another node in the blockchain system, so that the another node adds the recorded data to a temporary block when successfully verifying a source and integrity of the recorded data.

For example, services implemented by the application include:

(2.1) Wallet: used for providing a transaction function with electronic money, including transaction initiation (that is, a transaction record of a current transaction is transmitted to another node in the blockchain system, and the another node stores, after successfully verifying the transaction record, recorded data of the transaction to a temporary block in a blockchain in response to admitting that the transaction is valid). Certainly, the wallet further supports querying for remaining electronic money in an electronic money address.

(2.2) Shared ledger: used for providing functions of operations such as storage, query, and modification of account data. Recorded data of the operations on the account data is transmitted to another node in the blockchain system. The another node stores, after verifying that the account data is valid, the recorded data to a temporary block in response to admitting that the account data is valid, and may further transmit an acknowledgment to a node initiating the operations.

(2.3) Smart contract: which is a computerized protocol, may be used for executing conditions of a contract, and is implemented by using code that is deployed in the shared ledger and that is executed when a condition is satisfied. The code is used for completing, according to an actual service requirement, an automated transaction, for example, searching for a delivery status of goods purchased by a purchaser, and transferring electronic money of the purchaser to an address of a merchant after the purchaser signs for the goods. Certainly, the smart contract is not limited only to a contract used for executing a transaction, and may be further a contract used for processing received information.

(3) Blockchain: including a series of blocks that are consecutive in a chronological order of generation. Once a new block is added to the blockchain, the new block is no longer removed. The block records recorded data submitted by the node in the blockchain system.

Figure 7:
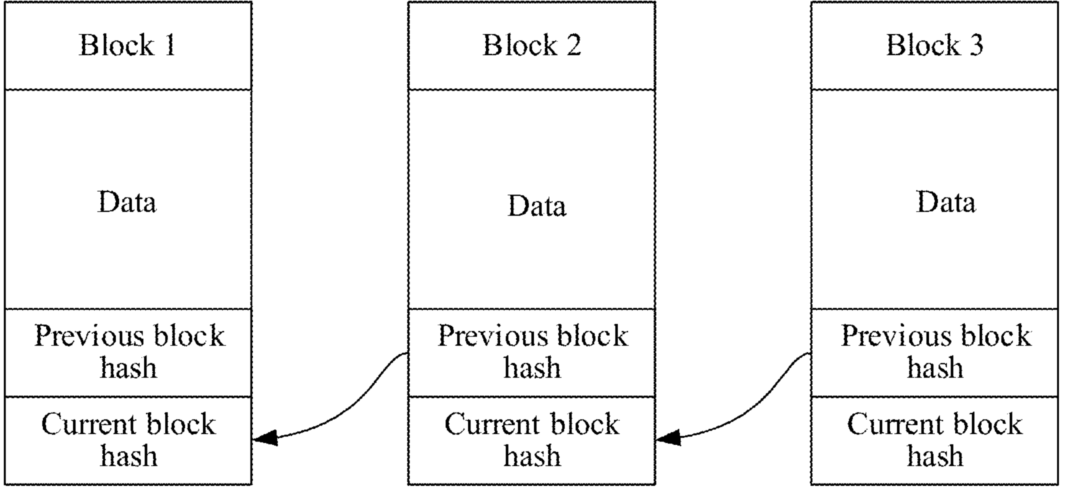
FIG. 7 is an example schematic diagram of a block structure according to an embodiment of the present disclosure.

FIG. 7 is an example schematic diagram of a block structure according to an embodiment of the present invention. Each block includes a hash value of a transaction record stored in the current block (a hash value of the current block) and a hash value of a previous block. Blocks are connected according to hash values to form a block chain. In addition, the block may further include information such as a timestamp indicating a block generation time. A blockchain is a decentralized database essentially, and is a series of associated data blocks generated by using a cryptographic method. Each data block includes related information, and is configured to verify the validity (anti-counterfeiting) of the information of the data block, and generate a next block.

In an embodiment, a computer device is provided, including a memory and a processor, the memory storing a computer program, the computer program, when executed by the processor, causing the processor to perform the steps in the foregoing method embodiments.

In an embodiment, a computer-readable storage medium is provided, storing a computer program, the computer program, when being executed by a processor, causing the processor to perform the steps in the foregoing method embodiments.

In an embodiment, a computer program product or a computer program is provided. The computer program product or the computer program includes computer instructions, and the computer instructions are stored in a computer-readable storage medium. The processor of the computer device reads the computer instructions from the computer-readable storage medium, and the processor executes the computer instructions, to cause the computer device to perform the steps in the method embodiments.

A person of ordinary skill in the art may understand that all or some of the processes of the methods in the foregoing embodiments may be implemented by a computer program instructing relevant hardware. The program may be stored in a non-volatile computer-readable storage medium. When the program runs, the processes of the foregoing methods in the embodiments are performed. Any reference to a memory, a storage, a database, or another medium used in the embodiments provided in the present disclosure may include a non-volatile and/or volatile memory. The non-volatile memory may include a read-only memory (ROM), a programmable ROM (PROM), an electrically programmable ROM (EPROM), an electrically erasable programmable ROM (EEPROM) or a flash memory. The volatile memory may include a random access memory (RAM) or an external high-speed cache. By way of description rather than limitation, the RAM may be obtained in a plurality of forms, such as a static RAM (SRAM), a dynamic RAM (DRAM), a synchronous DRAM (SDRAM), a double data rate SDRAM (DDR SDRAM), an enhanced SDRAM (ESDRAM), a synchlink (Synchlink) DRAM (SLDRAM), a rambus (Rambus) direct RAM (RDRAM), a direct rambus dynamic RAM (DRDRAM), and a rambus dynamic RAM (RDRAM).

The technical features in the foregoing embodiments may be combined in different manners to form other embodiments. To make the description concise, not all possible combinations of the technical features in the foregoing embodiments are described. However, combinations of the technical features shall all be considered as falling within the scope described in this specification provided that the combinations of the technical features do not conflict with each other.

The foregoing embodiments only show several implementations of the present disclosure, and descriptions thereof are in detail, but are not to be understood as a limitation to the patent scope of the present disclosure. A person of ordinary skill in the art may further make several variations and improvements without departing from the ideas of the present disclosure, and such variations and improvements all fall within the protection scope of the present disclosure. Therefore, the protection scope of the present disclosure is subject to the protection scope of the appended claims.

What is claimed is:

1. A video comparison method, performed by a computer device, the method comprising:
- obtaining a first video and a second video;
- obtaining a first image sequence from the first video, and obtaining a second image sequence from the second video;
- extracting a first definition feature vector of the first image sequence by using a first feature extraction mechanism of a video comparison model, comprising:
  - mapping first images in the first image sequence from a pixel space to a target embedding space by inputting the first image sequence into a convolutional neural network (CNN) in a first feature extraction layer of the first feature extraction mechanism, to obtain a first image feature vector of the first image sequence;
  - performing, based on a quantity of cells and a quantity of neurons of a long short-term memory (LSTM) network in a second feature extraction layer of the first feature extraction mechanism, a deformation operation on the first image feature vector outputted by the CNN, to obtain a reshaped first image feature vector; and
  - analyzing the first image feature vector based on a time sequence relationship among the first images corresponding to the first image feature vector by inputting the reshaped first image feature vector to the LSTM network in the second feature extraction layer of the first feature extraction mechanism, to obtain the first definition feature vector corresponding to the first image sequence;
- extracting a second definition feature vector of the second image sequence by using a second feature extraction mechanism of the video comparison model, the first feature extraction mechanism being the same as the second feature extraction mechanism; and
- determining a definition difference between the first video and the second video based on the first definition feature vector and the second definition feature vector by using a definition difference analysis mechanism of the video comparison model, the definition difference indicating whether a video clarity of the first video is higher or lower than a video clarity of the second video and being determined by:
  - performing a subtraction operation on the first definition feature vector and the second definition feature vector to obtain a subtraction result, and directly using the subtraction result as vector difference between the first definition feature vector and the second definition feature vector; and
  - using at least one fully connected layer on the vector difference between the first definition feature vector and the second definition feature vector to obtain the definition difference.

2. The video comparison method according to claim 1, wherein the obtaining a first video and a second video comprises:
- obtaining an original video;
- converting the original video according to a first video transcoding manner, to obtain the first video; and
- converting the original video according to a second video transcoding manner, to obtain the second video.

3. The video comparison method according to claim 2, wherein the converting the original video according to a first video transcoding manner, to obtain the first video comprises:
- converting the original video based on the first video transcoding manner provided by a video client, to obtain the first video; and
- the converting the original video according to a second video transcoding manner, to obtain the second video comprises:
- converting the original video based on the second video transcoding manner provided by a reference video client of the video client, to obtain the second video.

4. The video comparison method according to claim 2, wherein the second video transcoding manner is a preset reference video transcoding manner; and
- after the determining a definition difference between the first video and the second video based on the first definition feature vector and the second definition feature vector by using a definition difference analysis mechanism of the video comparison model, the method further comprises:
- determining a transcoding performance level of the first video transcoding manner compared to the preset reference video transcoding manner based on the definition difference.

5. The method according to claim 4, further comprising:
- determining to optimize or replace the first video transcoding manner based on the transcoding performance level.

6. The video comparison method according to claim 1, wherein the obtaining a first image sequence from the first video, and obtaining a second image sequence from the second video comprises:
- extracting a preset quantity of first images from the first video, to form the first image sequence; and
- extracting, from the second video, second images having same positions as the first images in the first video, to form the second image sequence.

7. The video comparison method according to claim 1, wherein the extracting a second definition feature vector of the second image sequence by using a second feature extraction mechanism of the video comparison model comprises:

mapping second images in the second image sequence from a pixel space to the target embedding space by using the second feature extraction mechanism, to obtain a second image feature vector of the second image sequence; and analyzing the second image feature vector based on a time sequence relationship among the second images corresponding to the second image feature vector by using the second feature extraction mechanism, to obtain the second definition feature vector corresponding to the second image sequence.

8. The video comparison method according to claim 1, wherein before the extracting a first definition feature vector of the first image sequence by using a first feature extraction mechanism of a video comparison model, the method further comprises:

obtaining training sample pairs, the training sample pairs comprising first image sequence samples and second image sequence samples, first image sequence samples in a same training sample pair being from a same first video sample, second image sequence samples in the same training sample pair being from a same second video sample, and a sample label of the training sample pair comprising an expected definition difference between the first video sample and the second video sample corresponding to the training sample pair;

obtaining a video comparison model to be trained, the video comparison model comprising the first feature extraction mechanism, the second feature extraction mechanism, and the definition difference analysis mechanism;

extracting a first definition feature vector of the first image sequence samples by using the first feature extraction mechanism;

extracting a second definition feature vector of the second image sequence samples by using the second feature extraction mechanism, the first feature extraction mechanism and the second feature extraction mechanism having same network structures and same network parameters;

analyzing the first definition feature vector and the second definition feature vector corresponding to the same training sample pair by using the definition difference analysis mechanism, to determine a predicted definition difference between the first video sample and the second video sample corresponding to the training sample pair; and performing parameter adjustment on the video comparison model based on the predicted definition difference and the expected definition difference of the training sample pair, until the training of the video comparison model is completed, the first feature extraction mechanism and the second feature extraction mechanism having same parameters after each parameter adjustment.

9. The video comparison method according to claim 8, wherein the extracting a first definition feature vector of the first image sequence samples by using the first feature extraction mechanism comprises:

mapping images in the first image sequence samples from a pixel space to a target embedding space by using the first feature extraction mechanism, to obtain a first image feature vector of the first image sequence samples; and analyzing the first image feature vector based on a time sequence relationship among the images corresponding to the first image feature vector by using the first feature extraction mechanism, to obtain the first definition feature vector of the first image sequence samples; and the extracting a second definition feature vector of the second image sequence samples by using the second feature extraction mechanism comprises:

mapping images in the second image sequence samples from a pixel space to the target embedding space by using the second feature extraction mechanism, to obtain a second image feature vector of the second image sequence samples; and analyzing the second image feature vector based on a time sequence relationship among the images corresponding to the second image feature vector by using the second feature extraction mechanism, to obtain the second definition feature vector of the second image sequence samples.

10. The video comparison method according to claim 8, wherein the analyzing the first definition feature vector and the second definition feature vector corresponding to the same training sample pair by using the definition difference analysis mechanism, to determine a predicted definition difference between the first video sample and the second video sample corresponding to the training sample pair comprises:

calculating a vector difference between the first definition feature vector and the second definition feature vector corresponding to the same training sample pair by using the definition difference analysis mechanism; and determining the predicted definition difference between the first video sample and the second video sample corresponding to the training sample pair based on the vector difference of the training sample pair.

11. The video comparison method according to claim 1, wherein the first video is obtained by using a first shooting mode of a camera, the second video is obtained by using a second shooting mode of the camera, and the method further comprises:

comparing impacts of the first shooting mode and the second shooting mode on video clarity based on the definition difference.

12. The method according to claim 1, wherein using the at least one fully connected layer on the vector difference comprises:

classifying the vector difference between the first definition feature vector and the second definition feature vector by using the at least one fully connected layer to obtain a one-dimensional vector difference; and performing a normalization operation on the one-dimensional vector difference to obtain the definition difference, wherein the at least one fully connected layer comprises a first fully connected layer having a same dimension as the first definition feature vector and a one-dimensional fully connected layer.

13. The method according to claim 1, wherein the quantity of neurons of the LSTM network corresponds to a quantity of frames in the first image sequence extracted from the first video.

14. The method according to claim 1, wherein the first definition feature vector and the second definition feature vector have a same dimension and are both multi-dimensional, and the subtraction operation is a bitwise subtraction.

15. A video comparison apparatus, comprising: a memory and a processor, the memory storing computer-readable instructions, the processor being configured, when executing the computer-readable instructions, to:

obtain a first video and a second video;

obtain a first image sequence from the first video, and obtain a second image sequence from the second video;

extract a first definition feature vector of the first image sequence by using a first feature extraction mechanism of a video comparison model, comprising:

mapping first images in the first image sequence from a pixel space to a target embedding space by inputting the first image sequence into a convolutional neural network (CNN) in a first feature extraction layer of the first feature extraction mechanism, to obtain a first image feature vector of the first image sequence;

performing, based on a quantity of cells and a quantity of neurons of a long short-term memory (LSTM) network in a second feature extraction layer of the first feature extraction mechanism, a deformation operation on the first image feature vector outputted by the CNN, to obtain a reshaped first image feature vector; and analyzing the first image feature vector based on a time sequence relationship among the first images corresponding to the first image feature vector by inputting the reshaped first image feature vector to the LSTM network in the second feature extraction layer of the first feature extraction mechanism, to obtain the first definition feature vector corresponding to the first image sequence;

extract a second definition feature vector of the second image sequence by using a second feature extraction mechanism of the video comparison model, the first feature extraction mechanism being the same as the second feature extraction mechanism; and determine a definition difference between the first video and the second video based on the first definition feature vector and the second definition feature vector by using a definition difference analysis mechanism of the video comparison model, the definition difference indicating whether a video clarity of the first video is higher or lower than a video clarity of the second video and being determined by:

performing a subtraction operation on the first definition feature vector and the second definition feature vector to obtain a subtraction result, and directly using the subtraction result as vector difference between the first definition feature vector and the second definition feature vector; and using at least one fully connected layer on the vector difference between the first definition feature vector and the second definition feature vector to obtain the definition difference.

16. The apparatus according to claim 15, wherein the processor is further configured to: obtain an original video; convert the original video according to a first video transcoding manner, to obtain the first video; and convert the original video according to a second video transcoding manner, to obtain the second video.

17. The apparatus according to claim 16, wherein the processor is further configured to: convert the original video based on the first video transcoding manner provided by a video client, to obtain the first video; and convert the original video based on the second video transcoding manner provided by a reference video client of the video client, to obtain the second video.

18. The apparatus according to claim 15, wherein the processor is further configured to: extract a preset quantity of first images from the first video, to form the first image sequence; and extract, from the second video, second images having same positions as the first images in the first video, to form the second image sequence.

19. The video comparison method according to claim 15, wherein the processor is further configured to:

map second images in the second image sequence from a pixel space to the target embedding space by using the second feature extraction mechanism, to obtain a second image feature vector of the second image sequence; and analyze the second image feature vector based on a time sequence relationship among the second images corresponding to the second image feature vector by using the second feature extraction mechanism, to obtain the second definition feature vector corresponding to the second image sequence.

20. A non-transitory storage medium storing computer-readable instructions, the computer-readable instructions, when executed by one or more processors, causing the one or more processors to perform:

obtaining a first video and a second video;

obtaining a first image sequence from the first video, and obtaining a second image sequence from the second video;

extracting a first definition feature vector of the first image sequence by using a first feature extraction mechanism of a video comparison model, comprising:

mapping first images in the first image sequence from a pixel space to a target embedding space by inputting the first image sequence into a convolutional neural network (CNN) in a first feature extraction layer of the first feature extraction mechanism, to obtain a first image feature vector of the first image sequence;

performing, based on a quantity of cells and a quantity of neurons of a long short- term memory (LSTM) network in a second feature extraction layer of the first feature extraction mechanism, a deformation operation on the first image feature vector outputted by the CNN, to obtain a reshaped first image feature vector; and analyzing the first image feature vector based on a time sequence relationship among the first images corresponding to the first image feature vector by inputting the reshaped first image feature vector to the LSTM network in the second feature extraction layer of the first feature extraction mechanism, to obtain the first definition feature vector corresponding to the first image sequence;

extracting a second definition feature vector of the second image sequence by using a second feature extraction mechanism of the video comparison model, the first feature extraction mechanism being the same as the second feature extraction mechanism; and determining a definition difference between the first video and the second video based on the first definition feature vector and the second definition feature vector by using a definition difference analysis mechanism of the video comparison model, the definition difference indicating whether a video clarity of the first video is higher or lower than a video clarity of the second video and being determined by:

performing a subtraction operation on the first definition feature vector and the second definition feature vector to obtain a subtraction result, and directly using the subtraction result as vector difference between the first definition feature vector and the second definition feature vector; and using at least one fully connected layer on the vector difference between the first definition feature vector and the second definition feature vector to obtain the definition difference.

* * * * *